(12) United States Patent
Tsukamoto (10) Patent No.: US 8,198,881 B2
(45) Date of Patent: Jun. 12, 2012

(54) CHOPPER TYPE DC-DC CONVERTER

(75) Inventor: Hiroshi Tsukamoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 588 days.

(21) Appl. No.: 12/146,214

(22) Filed: Jun. 25, 2008

(65) Prior Publication Data

US 2009/0003021 A1 Jan. 1, 2009

(30) Foreign Application Priority Data

Jun. 26, 2007 (JP) .................. 2007-168180

(51) Int. Cl.
*G05F 1/575* (2006.01)
*G05F 1/618* (2006.01)

(52) U.S. Cl. .................. 323/288; 323/259; 323/271

(58) Field of Classification Search .................. 323/222, 323/224, 225, 259, 282, 284, 288, 344, 271
See application file for complete search history.

(56) References Cited

U.S. PATENT DOCUMENTS 6,166,527 A * 12/2000 Dwelley et al. ............... 323/222
6,348,781 B1 * 2/2002 Midya et al. .................. 323/224

FOREIGN PATENT DOCUMENTS

| JP | 63103668 | 5/1988 |
| JP | 727831 | 6/1995 |
| JP | 2000166223 | 6/2000 |

* cited by examiner

*Primary Examiner* — Gary L Laxton
(74) *Attorney, Agent, or Firm* — Sughrue Mion, PLLC (57) ABSTRACT

A chopper type DC-DC converter includes a voltage converting circuit, a comparative wave generating circuit, a comparator group, and a switch control circuit. The voltage converting circuit converts a first voltage into a second voltage. The comparative wave generating circuit generates first and second comparative waves such that the voltage range of the first comparative wave is different from the voltage range of the second comparative wave. The comparator group generates a first comparison result signal indicating a result of comparison between the first comparative wave and an error signal indicating an error between the second voltage and target voltage and a second comparison result signal indicating a result of comparison between the second comparative wave and the error signal. The switch control circuit controls the voltage converting circuit based on the first and second comparison signals. The comparative wave generating circuit includes first and second comparative wave generating circuits. The first and second comparative wave generating circuits respectively generate the first and second comparative waves based on different source voltage groups.

7 Claims, 10 Drawing Sheets

CHOPPER TYPE DC-DC CONVERTER

INCORPORATION BY REFERENCE

This application is based upon and claims the benefit of priority from Japanese patent application No. 2007-168180, filed on Jun. 26, 2007, the disclosure of which is incorporated herein in its entirely by reference.

BACKGROUND OF THE INVENTION

1. Field of the Invention

The present invention relates to a chopper type DC-DC converter for converting primary voltage into secondary voltage by stepping up and stepping down the primary voltage.

2. Description of Related Art

For a recent portable device, a battery such as a lithium ion battery or a dry cell battery is used. Such battery has a wide range of battery voltage. For example, battery voltage of one lithium ion battery cell has a value in a range from about 2.7 V to about 4.2 V, and battery voltage of two dry cell batteries has a value in a range from 1.8 V to 3.6 V. On the other hand, a device driven by a battery often requires voltage at a specific value within the range of battery voltage of the battery, such as 3.3 V or 2.5 V. In this case, if the battery is fully charged, the battery voltage is stepped down by a step down circuit to the required voltage, and then supplied to the device. On the other hand, if the remaining battery level of the battery is low and the battery voltage is lower than the required voltage of the device, the battery voltage is stepped up to the required voltage, and then supplied to the device. In order to step up and step down battery voltage, a step-up and step-down DC-DC converter is used. As such DC-DC converter, a chopper type step-up and step-down DC-DC converter is widely used from the perspectives of a simple circuit configuration and an advantage in miniaturization.

The chopper type DC-DC converter requires improvement in voltage conversion efficiency. It is required to improve the voltage conversion efficiency without having a circuit configuration complicated and without deteriorating response of an entire system.

Figure 1:
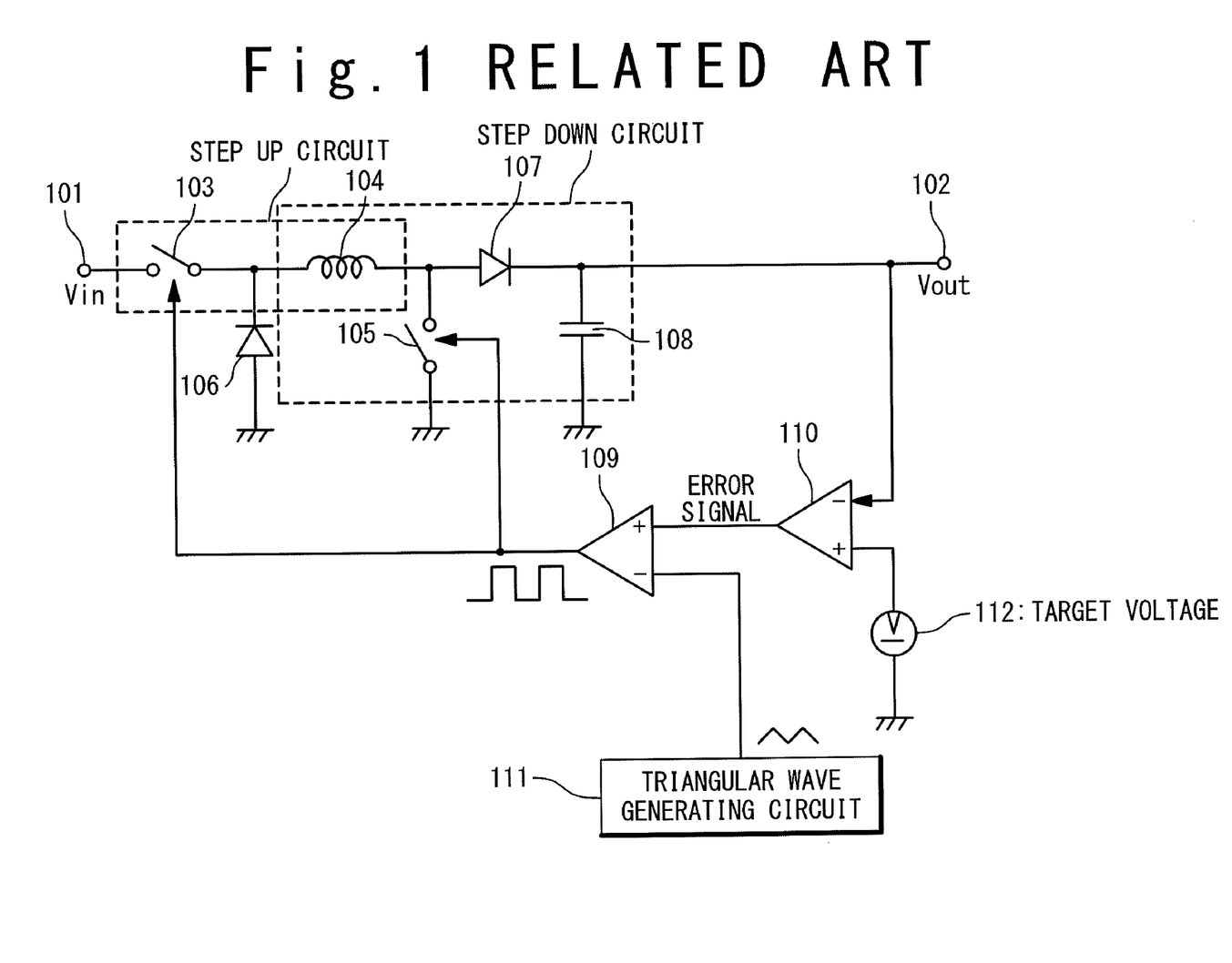
FIG. 1 is a circuit diagram of a typical DC-DC converter.

FIG. 1 is a circuit diagram showing schematically a typical chopper type step-up and set-down DC-DC converter. The DC-DC converter includes a step-up circuit, a step-down circuit, a comparator 109, an error amplifier 110, a triangular wave generating circuit 111, and a target voltage generating source 112. The step-down circuit includes a switch 103, a reactor 104, and a diode 106. A primary voltage 101 is supplied to an input side of the switch 103. The reactor 104 is connected to an output side of the switch 103. The diode 106 is provided to prevent backflow. In the step-down circuit, by switching the switch 103, energy stored in the reactor 104 is released as a stepped-down voltage. The step-up circuit includes the reactor 104, a switch 105, a diode 107, and a capacitor 108. The reactor 104 is shared by the step-up circuit and the step-down circuit. By switching the switch 105, energy stored in the capacitor 108 is released as a stepped-up voltage. The voltage outputted from the step-up circuit is outputted outside as a secondary voltage 102. The switching of the switches (103 and 105) of the step-up and step-down circuits is performed based on a signal supplied from the comparator 109. The comparator 109 compares an error signal supplied from the error amplifier 110 with a comparative wave (triangular wave) supplied from the triangular wave generating circuit 111, and switches the switches 103 and 105 based on a result of the comparison.

In the DC-DC converter shown in FIG. 1, the switches of the step-up and step-down circuits are switched at the same timing without exception. Accordingly, the step-up and step-down circuits are simultaneously operated, so that energy loss is large, and therefore voltage conversion efficiency is very poor.

Figure 2:
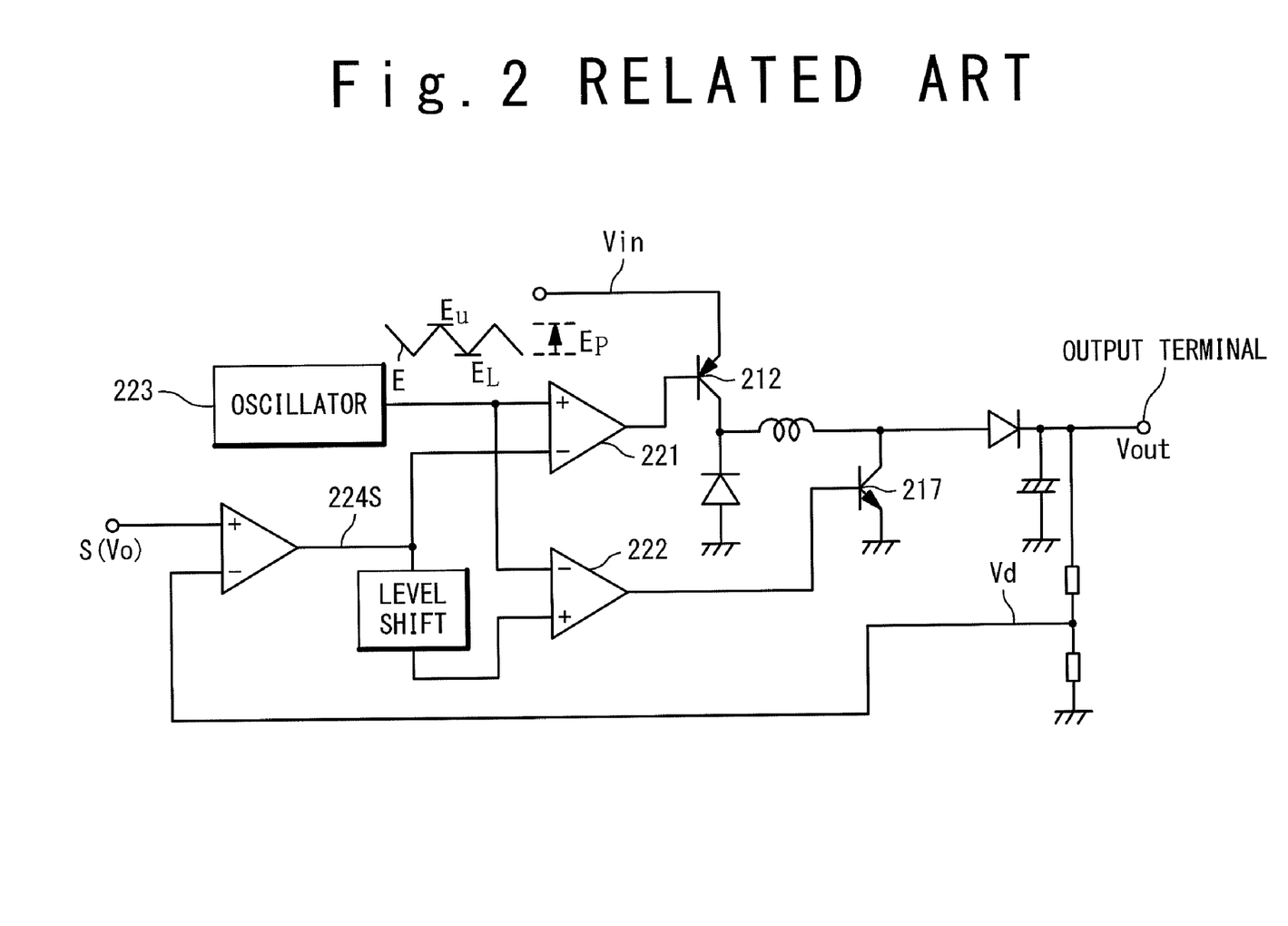
FIG. 2 is a circuit diagram of a related DC-DC converter.

On the other hand, Japanese Examined Utility Model Application Publication (JU-Y-Heisei 07-027831) discloses a DC-DC converter. FIG. 2 is a circuit diagram of the DC-DC converter. The DC-DC converter includes a first comparator 221 for switching a step-down transistor 212 as a switch of a step-down circuit and a second comparator 222 for switching a step-up transistor 217 as a switch of a step-up circuit. In the DC-DC converter, an error signal 224S is supplied to a negative input terminal of the first comparator 221. On the other hand, a positive input terminal of the second comparator 222 is supplied with a level-shifted error signal 224S through a level shift circuit. A positive input terminal of the first comparator 221 and a negative input terminal of the second comparator 222 are supplied with a triangular wave generated by an oscillator 223 as a comparative wave. Japanese Examined Utility Model Application Publication (JU-Y-Heisei 07-027831) describes that the switching of only one of the step-up and step-down transistors 217 and 212 is controlled, and therefore switching loss can be reduced.

Figure 3:
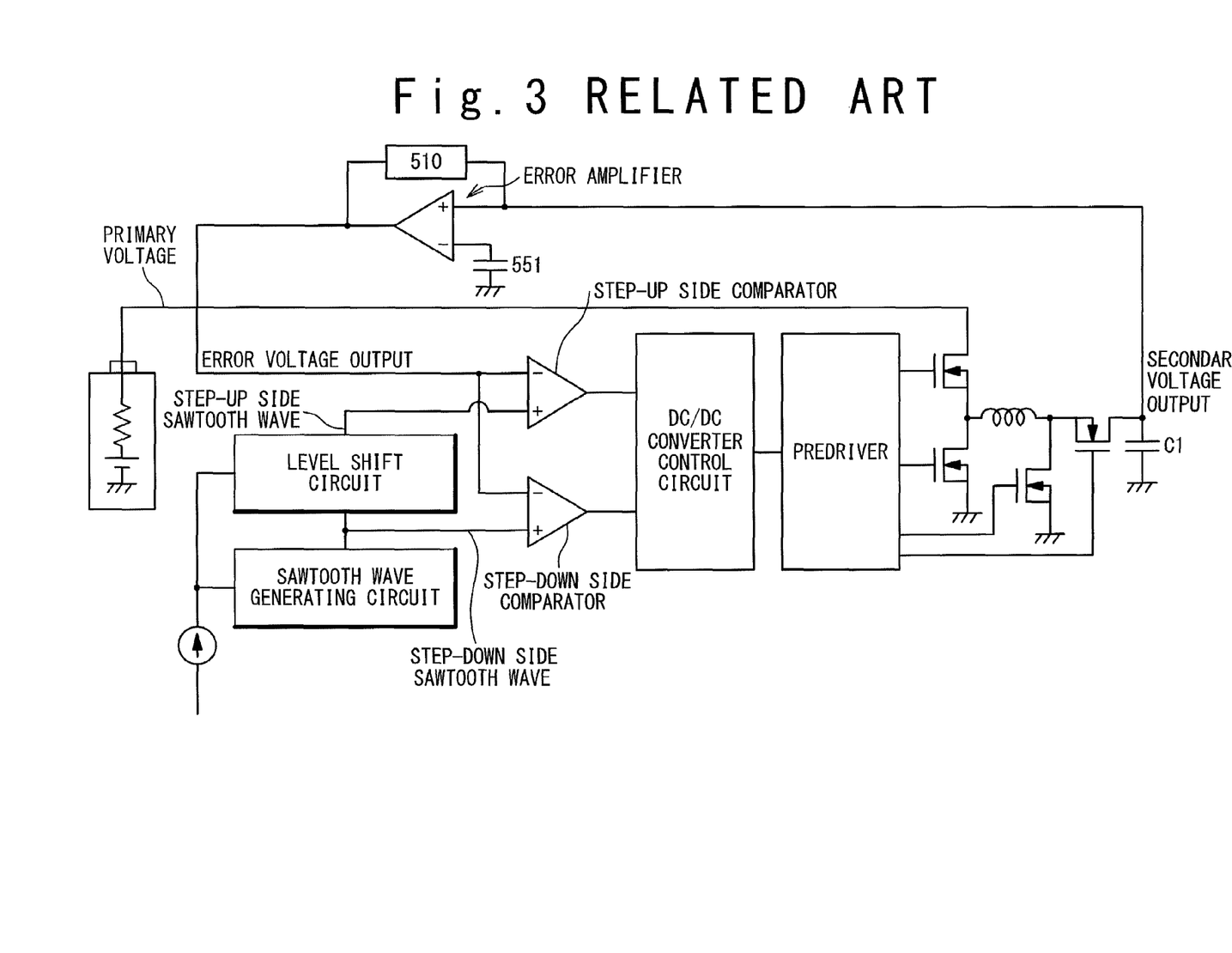
FIG. 3 is a circuit diagram of a related DC-DC converter.
Figure 4:
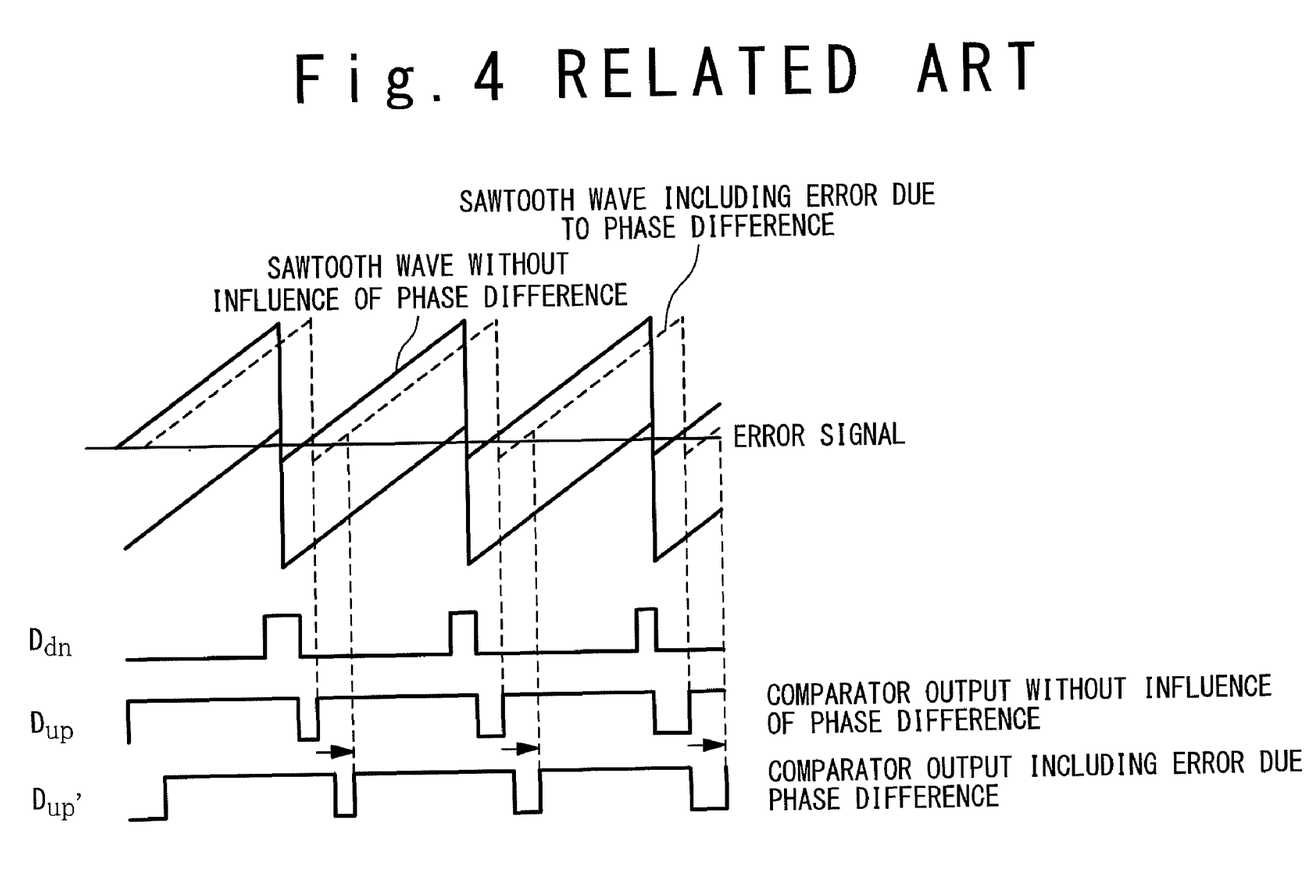
FIG. 4 shows waveforms outputted from comparators of the DC-DC converter of FIG. 2.

Japanese Laid Open Patent Application (JP-P2000-166223A) discloses that a synchronizing clock is supplied to a sawtooth wave generating circuit and a level shift circuit to synchronize the waveforms of comparative waves (sawtooth waves) respectively supplied to a step-up side comparator and a step-down side comparator with each other. FIG. 3 is a circuit diagram of a DC-DC converter disclosed in Japanese Laid Open Patent Application (JP-P2000-166223A). As shown in FIG. 3, a positive input terminal of the step-down side comparator is supplied with the sawtooth wave from the sawtooth wave generating circuit. A positive input terminal of the step-down side comparator is supplied with the sawtooth wave shifted-up by the level shift circuit. Minus input terminals of the step-up side and step-down side comparators are supplied with an error voltage from an error amplifier. The level shift circuit and the sawtooth wave generating circuit are supplied with a current source and the synchronizing clock, and thus waveforms of the sawtooth waves supplied to the step-up side and step-down side comparators are same in shape but different in level. In general, a signal having passed through a level shift circuit has an influence due to a phase difference. Accordingly, there is concern that a ratio (duty ratio) between a time period in which a comparator outputs a high level and a time period in which the comparator outputs a low level deviates from an ideal ratio due to the phase difference. However, according to Japanese Laid Open Patent Application (JP-P2000-166223A), the waveforms of the sawtooth waves are synchronized each other based on the synchronizing clock, and thus the duty ratio between signals (Dup and Dup') outputted by the comparators is unchanged as shown in FIG. 4. Note that Ddn in FIG. 4 represents an output of the step-down side comparator.

In addition, Japanese Laid Open Patent Application (JP-A-Showa 63-103668) discloses an art concerning to a comparative wave supplied to a comparator of a push-pull type step-up and step-down converter.

The present inventor has recognized as follows.

As described in the above Japanese Examined Utility Model Application Publication (JU-Y-Heisei 07-027831) and Japanese Laid Open Patent Application (JP-P2000-166223A), if both the step-up and step-down comparators are provided separately and the error signal or comparative wave supplied to one of the comparators is level-shifted, only one of the step-down and step-up circuits can be driven depending on the level of the error signal, and therefore energy loss can be suppressed.

However, in a case of using the level shift circuit, there is a phase difference between an input signal to the level shift circuit and an output signal therefrom due to gain and offset of the level shift circuit. For this reason, a phase correction circuit is required to compensate both the phase difference due to the level shift circuit and a phase difference for the error signal due to a feedback loop. This causes problems that a circuit configuration is complicated and response of an entire system is deteriorated.

Figure 5:
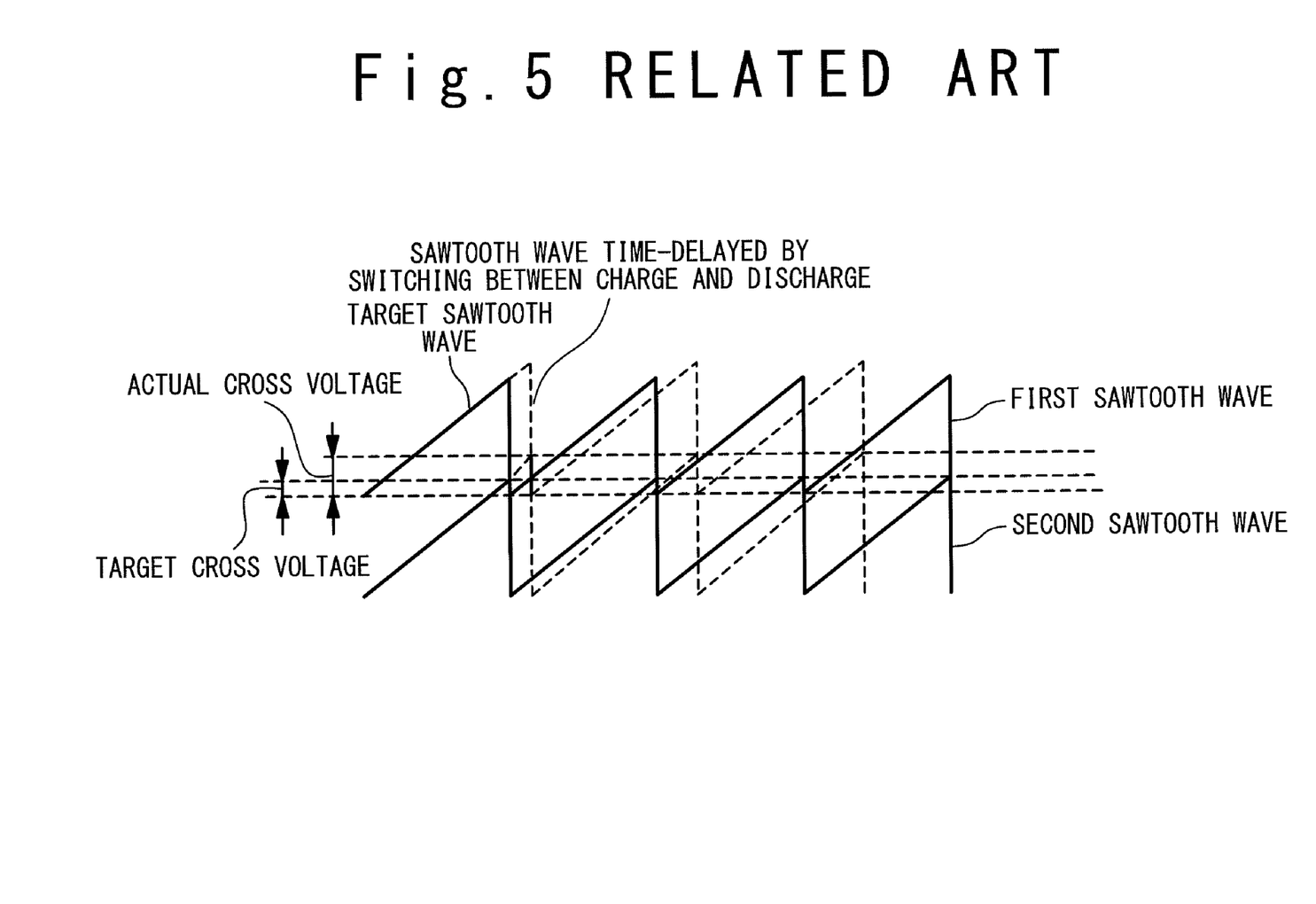
FIG. 5 is an explanatory drawing for explaining cross voltage.

Also, it is difficult to adequately control a level shift amount in the level shift circuit. Accordingly, in practice, it is necessary to partially overlap a range in which the step-up circuit is driven and a range in which the step-down circuit is driven to secure a margin. For example, if the sawtooth wave as the comparative wave is shifted up and then supplied to the step-up side comparator, as shown in FIG. 5, amplitudes of a first sawtooth wave as the sawtooth wave supplied to the step-up side comparator and a second sawtooth wave as the sawtooth wave supplied to the step-down side comparator are partially crossed each other to secure a margin. The margin is indicated as a target cross margin. If the level of the error signal falls within range of voltage of the crossing portion, both of the step-up and step-down circuits will be driven simultaneously, resulting in poor voltage conversion efficiency.

Figure 6:
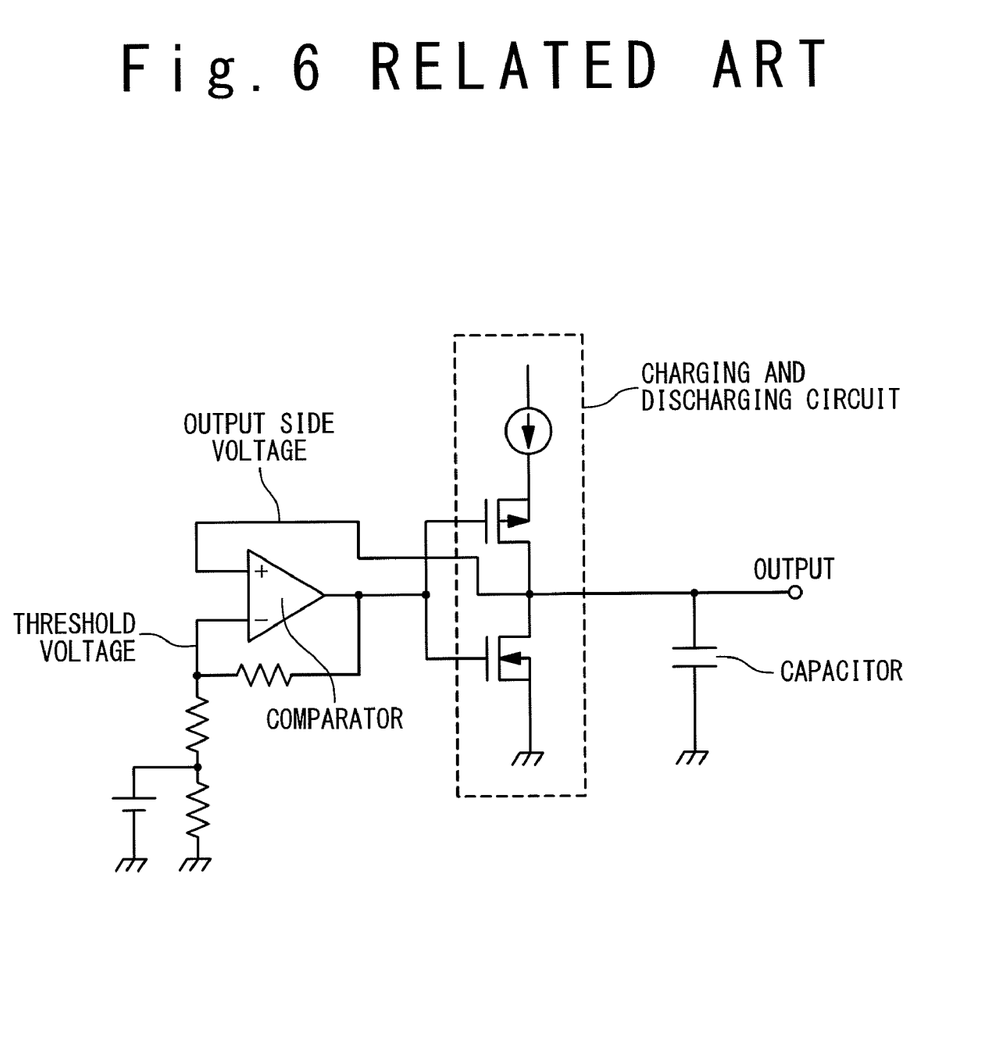
FIG. 6 is a circuit diagram of a sawtooth wave generating circuit.

Furthermore, if a high frequency wave is used as the comparative wave, a charging and discharging switching circuit in the oscillator for generating the comparative wave will have a delay time, resulting in an increase in amplitude of the comparative wave. The reason will be described referring to FIG. 6. FIG. 6 is a circuit diagram of the sawtooth wave generating circuit. The sawtooth wave generating circuit includes a comparator, a charging and discharging circuit, and a capacitor. The comparator detects a voltage at an output terminal, and controls the charging and discharging circuit to be in one of charging and discharging modes such that the output terminal voltage falls within a range between a lower threshold and an upper threshold. The lower and upper thresholds are determined by a threshold voltage inputted to a negative input terminal of the comparator.

Specifically, if the charging and discharging circuit is set in the charging mode, a constant current is supplied to the capacitor, and an output side voltage is increased at a constant rate. When the output side voltage reaches the upper threshold, the comparator set the charging and discharging circuit in the discharging mode. When the charging and discharging circuit is set in the discharging mode, the capacitor is discharged via the charging and discharging circuit, and the output side voltage is decreased. When the output side voltage reaches the lower threshold, the comparator sets the charging and discharging circuit to be in the charging mode again. Thus, the sawtooth wave is generated. By increasing a current flowing into the capacitor at the charging mode, the frequency of the sawtooth wave is increased. However, if the frequency is increased, the timing at which the comparator switches the charging and discharging circuit between the charging and discharging modes is delayed from the timing at which the output side voltage reaches the threshold. For this reason, the capacitor is excessively charged or discharged, and therefore the output side voltage exceeds the threshold value. Consequently, the amplitude of the comparative wave is increased. That is, as shown in FIG. 5, an actual sawtooth wave indicated by a dashed line is deviated from a target sawtooth wave indicated by a solid line, and therefore an actual range of the cross voltage is wider than a range of the target cross voltage. For this reason, the range in which both of the step-up and step-down circuits are driven is extended.

SUMMARY

In one embodiment, a chopper type DC-DC converter includes a voltage converting circuit, a comparative wave generating circuit, a comparator group, and a switch control circuit. The voltage converting circuit converts a first voltage into a second voltage. The comparative wave generating circuit generates a first comparative wave and a second comparative wave such that a voltage range of the first comparative wave is different from a voltage range of the second comparative wave. The comparator group generates a first comparison result signal indicating a result of comparison between the first comparative wave and an error signal indicating an error between the second voltage and target voltage and a second comparison result signal indicating a result of comparison between the second comparative wave and the error signal. The switch control circuit controls the voltage converting circuit based on the first comparison result signal and the second comparison signal. The comparative wave generating circuit includes a first comparative wave generating circuit and a second comparative wave generating circuit. The first comparative wave generating circuit and the second comparative wave generating circuit respectively generate the first comparative wave and the second comparative wave based on different source voltage groups.

In another embodiment, a chopper-mode DC-DC converting method includes: converting a first voltage into a second voltage; generating a first comparative wave and a second comparative wave based on different source voltage groups such that a voltage range of the first comparative wave is different from a voltage range of the second comparative wave; comparing an error signal indicating an error between the second voltage and a target voltage with each of the first comparative wave and the second comparative wave; and controlling the converting based on a result of the comparing.

According to the converter and the converting method, the first comparative wave and the second comparative wave different each other in amplitude are generated respectively based on the different source voltage groups. Since the first comparative wave and the second comparative wave are generated respectively, a level shift circuit is not required and phase difference has little or no influence.

Therefore, according to the embodiments, a chopper type DC-DC converter and a chopper-mode DC-DC converting method are provided which enable reduction of an unwanted influence due to phase difference and improvement of response.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 7:
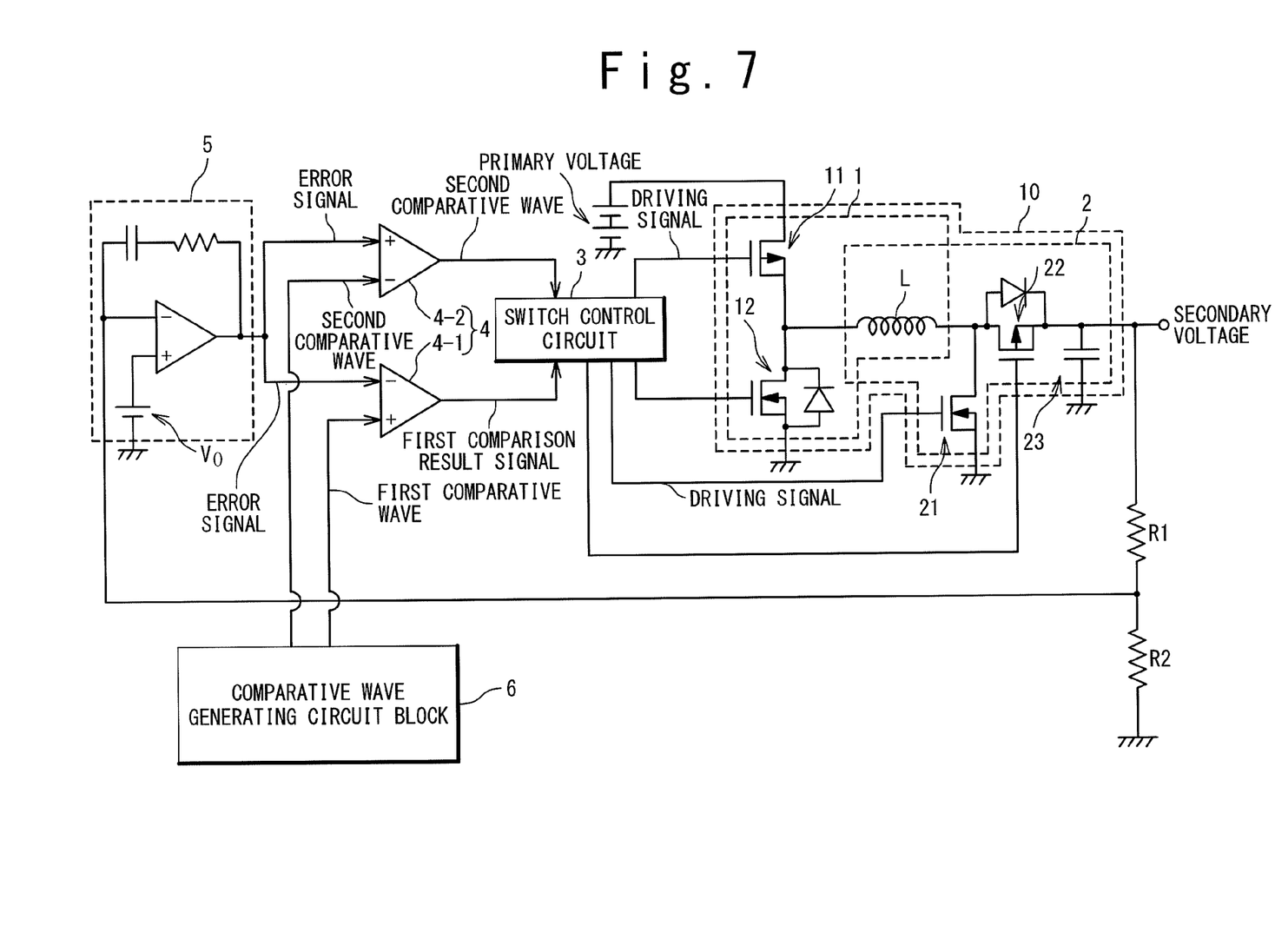
FIG. 7 is a circuit diagram of a DC-DC converter according to a first embodiment of the present invention.

FIG. 7 is a circuit diagram showing schematically a DC-DC converter according to a first embodiment of the resent invention. As shown in FIG. 7, the DC-DC converter includes a voltage converting circuit 10, a switch control circuit 3, a comparator group 4, an error detection circuit 5, and a comparative wave generating circuit 6. The voltage converting circuit includes a step-down circuit 1 and a step-up circuit 2. The comparator group 4 includes a first comparator 4-1 and a second comparator 4-2. The first comparator 4-1 may be referred to as a first detection circuit. The second comparator 4-2 may be referred to as a second detection circuit.

The voltage converting circuit 10 will be described. The step-down circuit 1 includes a pair of transistors 11 and 12, and a reactor L. The transistor 11 is supplied with a primary voltage at a terminal thereof. An input terminal of the reactor L is connected to the other terminal of the transistor 11. A terminal of the transistor 12 is connected to a node between the reactor L and the transistor 11. The other terminal of the transistor 12 is grounded. Also, in parallel with the transistor 12, a diode is provided to prevent backflow. The transistors 11 and 12 are provided such that when one of them is in ON state, the other one is in OFF state. By repeating switching between ON and OFF states of the transistor 11 and switching between ON and OFF states of the transistor 12, the primary voltage is stepped down and then outputted. Gates of the transistors 11 and 12 are controlled based on a step-down driving signal from the switch control circuit 3. The voltage outputted from the step-down circuit 1 is decreased as a time period for which the transistor 11 is in OFF state increases.

A step-up circuit 2 includes a pair of transistors 21 and 22, a capacitor 23, and the reactor L. The reactor L is shared between the step-down circuit 1 and the step-up circuit 2. A terminal of the transistor 21 is connected to an output terminal of the reactor L. The other terminal of the transistor 21 is grounded. A terminal of the transistor 22 is connected to the output terminal of the reactor L. The other terminal of the transistor 22 is connected to an output terminal of the DC-DC converter. An electrode of the capacitor 23 is connected to the output terminal of the DC-DC converter. The other electrode of the capacitor 23 is grounded. The transistors 21 and 22 are provided such that when one of them is in ON state, the other one is in OFF state. By switching the transistors 21 and 22, energy is stored in the capacitor 23, and then released. From the capacitor 23, the stored energy is released as a secondary voltage higher than the voltage inputted to the step-up circuit 2. Gates of the transistors 21 and 22 are controlled by a step-up driving signal from the switch control circuit 3. The secondary voltage outputted from the step-up circuit 2 is increased as a time period for which the transistor 21 is in ON state decreases.

The switch control circuit 3 switches each of the transistors of the voltage converting circuit 10 between ON state and OFF state. The switch control circuit 3 supplies the step-up driving signal to the gates of the transistors 21 and 22 of the step-up circuit 2 based on a first comparison result signal supplied from the first comparator 4-1 to thereby ON-OFF control the transistors 21 and 22. Also, the switch control circuit 3 supplies a step-down driving signal to the gates of the transistors 11 and 12 of the step-down circuit 1 based on a second comparison result signal supplied from the second comparator 4-2 to thereby ON-OFF control the transistors 11 and 12.

The first comparator 4-1 compares an error signal with a first comparative wave, and supplies to the switch control circuit 3 the first comparison result signal indicating a result of the comparison. The error signal is supplied from the error detection circuit 5 to a negative input terminal of the first comparator 4-1. The first comparative wave is supplied from the comparative wave generating circuit 6 to a positive input terminal of the first comparator 4-1.

The second comparator 4-2 compares the error signal with a second comparative wave, and supplies to the switch control circuit 3 the second comparison result signal indicating a result of the comparison. The error signal is supplied to a positive input terminal of the second comparator 4-2. The second comparative wave is supplied to a negative input terminal of the second comparator 4-2. The error signal is supplied from the error detection circuit 5. The second comparative wave is supplied from the comparative wave generating circuit 6.

The error detection circuit 5 compares the secondary voltage with a target voltage and supplies the error signal indicating an error between them to the comparators 4-1 and 4-2. The error signal generated by the error detection circuit 5 is supplied to the negative input terminal of the first comparator 4-1 and the positive input terminal of the second comparator 4-2. For example, an error amplifier is used as the error detection circuit 5. A negative input terminal of the error amplifier is supplied with a voltage into which the secondary voltage has been divided by voltage dividing resistors R1 and R2. A positive input terminal of the error amplifier is connected to a direct-current power supply V0 which indicates the target voltage.

Figure 8:
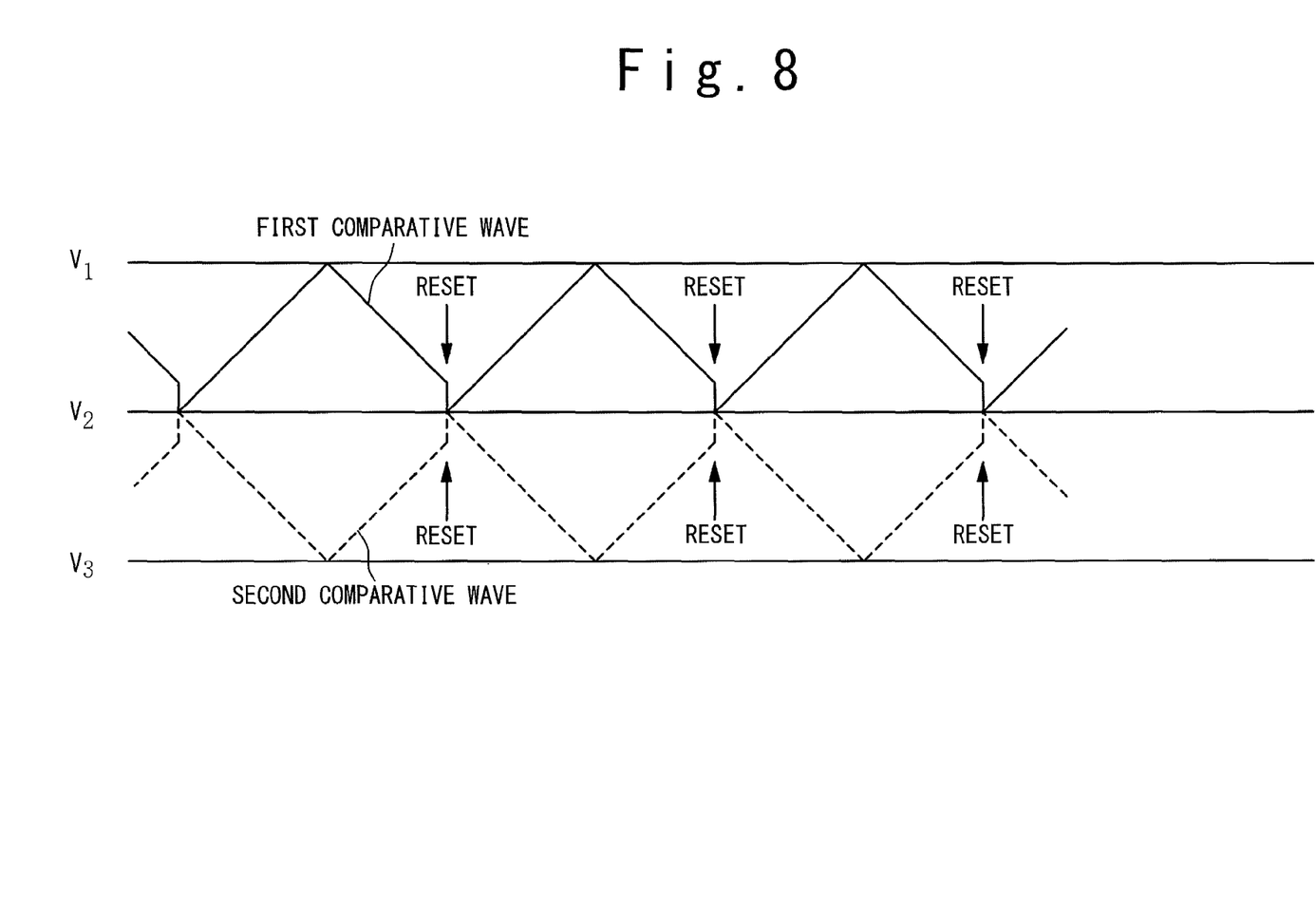
FIG. 8 is an explanatory drawing for explaining waveforms of first and second comparative waves.

The comparative wave generating circuit 6 generates the first and second comparative waves. FIG. 8 is an explanatory drawing for explaining waveforms of the first and second comparative waves. As shown in FIG. 8, amplitude of the first comparative wave ranges from a second reference voltage V2 to a first reference voltage V1. The voltage of the first comparative wave rises from the voltage V2 to the voltage V1 at a constant rate, and after having reached the voltage V1, falls at the constant rate. Immediately before reaching the voltage V2 during the falling, the voltage of the first comparative wave is reset to the voltage V2 and the cycle is repeated. On the other hand, amplitude of the second comparative wave ranges from a third reference voltage V3 to the second reference voltage V2. The second comparative wave is opposite in phase to the first comparative wave. That is, the voltage of the second comparative wave falls at the constant rate from the voltage V2 to the voltage V3, and after having reached the voltage V3, rises at the constant rate. Also, immediately before reaching the voltage V2 during the rising, the voltage of the second comparative wave is reset to the voltage V2 and the cycle is repeated. The first and second comparative waves are reset at the same timing. The first comparative wave and the second comparative wave are symmetric with respect to the line of the voltage V2. The voltage range of the first comparative wave is different from the voltage range of the second comparative wave.

Figure 9:
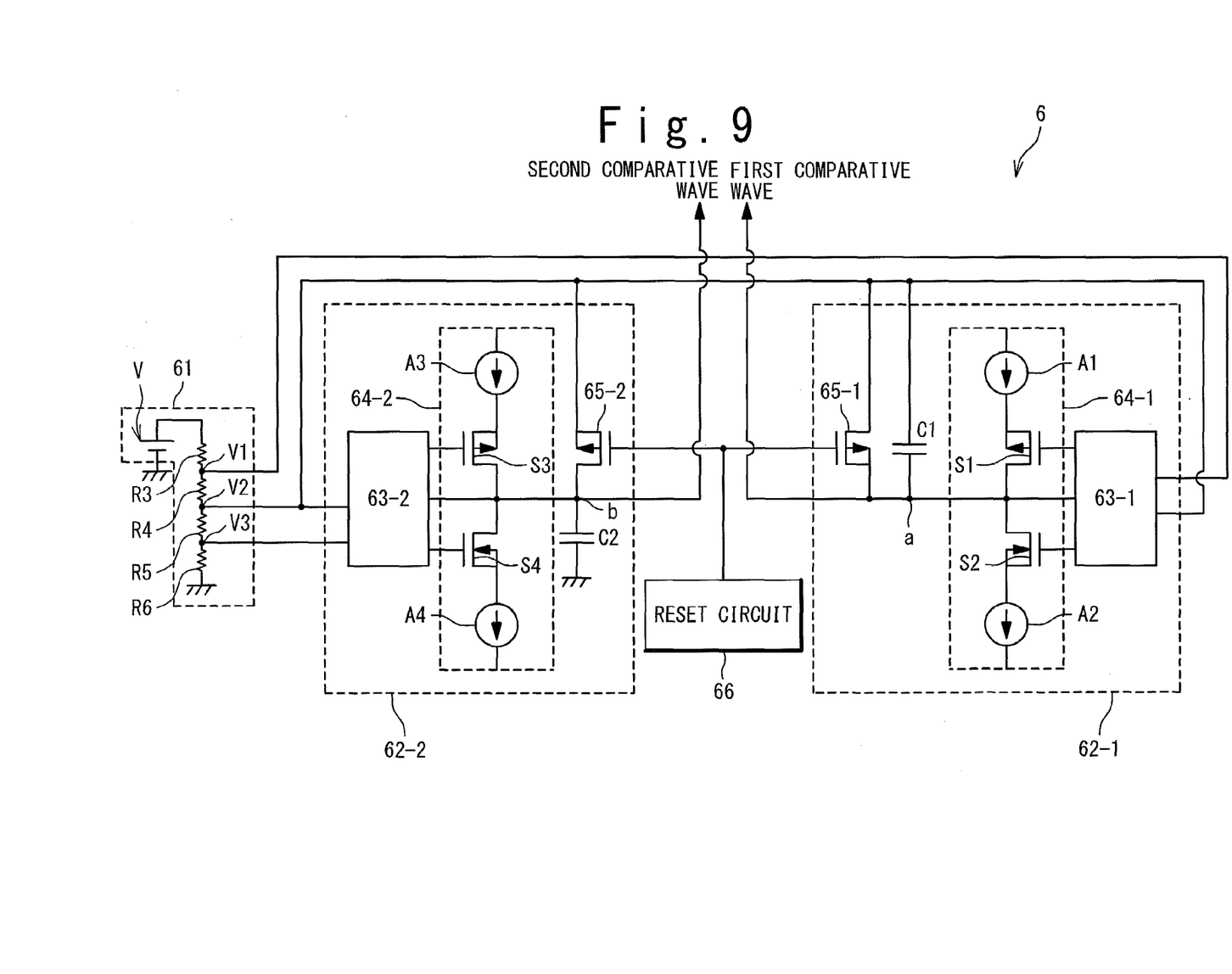
FIG. 9 is a circuit diagram of a comparative wave generating circuit.

Referring to FIG. 9, the comparative wave generating circuit 6 is described in detail. The comparative wave generating circuit 6 includes a reference voltage supply circuit 61, a first comparative wave generating circuit 62-1, a second comparative wave generating circuit 62-2, and a reset circuit 66.

The reference voltage supply circuit 61 includes a direct-current power supply V for the generation of the comparative waves, and a plurality of resistors R3 to R6 for voltage division. The plurality of resistors R3 to R6 are connected in series between the power supply V and ground. The resistor R6 is arranged between the ground and the resistor R5. The resistor R5 is arranged between the resistors R6 and R4. The resister R4 is arranged between the resistors R5 and R3. The resistor R3 is arranged between the resistor R4 and the power supply V. The reference voltage supply circuit 61 generates the reference voltages V1 to V3. The reference voltage supply circuit 61 supplies the first reference voltage V1 from a node V1 between the resistors R3 and R4 to the first comparative wave generating circuit 62-1. The reference voltage supply circuit 61 supplies the second reference voltage V2 from a node V2 between the resistors R4 and R5 to the first and second comparative wave generating circuits 62-1 and 62-2. The reference voltage supply circuit 61 supplies the third reference voltage V3 from a node V3 between the resistors R5 and R6 to the second comparative wave generating circuit 62-2.

The first comparative wave generating circuit 62-1 generates the first comparative wave based on the first and second reference voltages V1 and V2. The first comparative wave generating circuit 62-1 includes a charging and discharging control circuit 63-1, a charging and discharging circuit 64-1, a capacitor C1, and a reset switch 65-1.

The charging and discharging control circuit 63-1 switches the charging and discharging circuit 64-1 between charging and discharging modes. The charging and discharging control circuit 63-1 is supplied with the voltages V1, V2, and an output voltage of the first comparative wave generating circuit 62-1. For example, the output voltage is a voltage at an output terminal a (or node a) of the first comparative wave generating circuit 62-1. The output voltage may be referred to as an output terminal voltage a. The charging and discharging control circuit 63-1 switches the charging and discharging modes of the charging and discharging circuit 64-1 based on the output terminal voltage a. Specifically, the charging and discharging circuit 64-1 is switched into the charging mode when the output terminal voltage a reaches the voltage V2 and the circuit 64-1 is switched into the discharging mode when the output terminal voltage a reaches the voltage V1.

The charging and discharging circuit 64-1 charges and discharges the capacitor C1. The charging and discharging circuit 64-1 includes a pair of transistors S1 and S2, and a pair of constant current sources A1 and A2. In the charging mode, the transistor S1 is set in ON state and the transistor S2 is set in OFF state, and thus the constant current source A1 charges the capacitor C1. In the discharging mode, the transistor S1 is set in OFF state and the transistor S2 is set in ON state, and thus the constant current source A2 discharges the capacitor C1. Gates of the transistors S1 and S2 are connected to the charging and discharging control circuit 63-1. The charging and discharging control circuit 63-1 controls voltages applied to the gates of the transistors S1 and S2 to switch the charging and discharging circuit 64-1 between the charging and discharging modes.

An electrode of the capacitor C1 is connected to the output terminal of the first comparative wave generating circuit 62-1. The second reference voltage V2 is supplied to the other electrode of the capacitor C1. By charging the capacitor C1 through the charging and discharging circuit 64-1, the output terminal voltage a rises. By discharging the capacitor C1 through the charging and discharging circuit 64-1, the output terminal voltage a falls.

The reset switch 65-1 is provided to switch on and off the supply of the reference voltage V2 to the output terminal of the first comparative wave generating circuit 62-1. The reset switch 65-1 includes a transistor. A gate of the reset switch 65-1 is connected to the reset circuit 66. The reset circuit 66 supplies a reset signal to the gate to set the reset switch 65-1 in ON state, and thus the output terminal voltage a is reset to the voltage V2.

The second comparative wave generating circuit 62-2 generates the second comparative wave based on the second and third reference voltages V2 and V3. The second comparative wave generating circuit 62-2 includes a charging and discharging control circuit 63-2, a charging and discharging circuit 64-2, a capacitor C2, and a reset switch 65-2, similarly to the first comparative wave generating circuit 62-1. However, the charging and discharging control circuit 63-2 is supplied with the second and third reference voltages V2 and V3. An electrode of the capacitor C2 is grounded. The charging and discharging control circuit 63-2 switches the charging and discharging circuit 64-2 into a discharging mode when an output voltage of the second comparative wave generating circuit 62-2 reaches the voltage V2. For example, the output voltage is a voltage at an output terminal b (or node b) of the second comparative wave generating circuit 62-2. The output voltage may be referred to as an output terminal voltage b. When the output terminal voltage b reaches the voltage V3, the charging and discharging control circuit 63-2 switches the charging and discharging circuit 64-2 into a charging mode. A constant current source A3 of the charging and discharging circuit 64-2 charges the capacitor C2 at the same current value as the constant current source A1 charges the capacitor C1. A constant current source A4 of the charging and discharging circuit 64-2 discharges the capacitor C2 at the same current value as the constant current source A2 discharges the capacitor C1.

The reset circuit 66 generates the reset signal and supplies it to the reset switches 65-1 and 65-2 at a predetermined timing. Thus, the output terminal voltages of the first and second comparative wave generating circuits 62-1 and 62-2 are forced to be reset to the voltage V2.

For example, the reset circuit 66 is supplied with a reference voltage V1.5 between the reference voltages V2 and V1 from a circuit other than the voltage dividing resistors, and short-circuits the output terminals a and b to the voltage V2 through an open drain in response to the detection of the output terminal voltage a being the voltage V1.5. The reset circuit 66 may short-circuit the output terminals a and b in response to the detection of the change of the sign of the deference (a−V1.5) from positive to negative. Alternatively, the reset circuit 66 generates the reset signal based on externally-supplied clock which has a frequency slightly higher than that of the comparative wave generating circuit. Alternatively, the reset circuit 66 generates the reset signal by using a multivibrator set to have a frequency slightly higher than that of the comparative wave generating circuit.

The comparative wave generating circuit 6 oscillates the output terminal voltages a and b as described above, and generates the first and second comparative waves having the waveforms as shown in FIG. 8. Note that the first and second comparative waves are separately generated by the first and second comparative wave generating circuits, respectively. Since one of the comparative waves is not level-shifted to generate the other comparative wave, the influence of phase difference due to a level shift circuit is not involved and is not required to be considered.

Also, the reset circuit 66 resets the first and second comparative waves to the voltage V2 at the same timing. This allows the first and second comparative waves to be kept in exactly opposite phases to each other.

Furthermore, since the output terminal voltages a and b are reset to the voltage V2, the timing at which the charging and discharging control circuits 63-1 and 63-2 respectively switch the charging and discharging circuits 64-1 and 64-2 between the charging and discharging modes and the timing at which the output terminal voltages a and b reach the voltage V2 do not deviate from each other. Accordingly, the first comparative wave is prevented from having a voltage lower than the voltage V2, and also the second comparative wave is prevented from having a voltage higher than the voltage V2. That is, the amplitudes of the first and second comparative waves are never crossed each other with having a finite crossing portion (or margin). In addition, a time period necessary to bring the reset switches 65-1 and 65-2 into ON state after the reset signal has been supplied to the reset switches 65-1 and 65-2, and a time period necessary to reset the output terminal voltages of the comparative wave generating circuits 62-1 and 62-2 to the voltage V2 after the reset switches 65-1 and 65-2 have been brought into ON state are sufficiently short as compared with an operating frequency (200 kHz to 1 MHz) of a typical DC-DC converter, and thus delay times due to such operations can be ignored.

Figure 10:
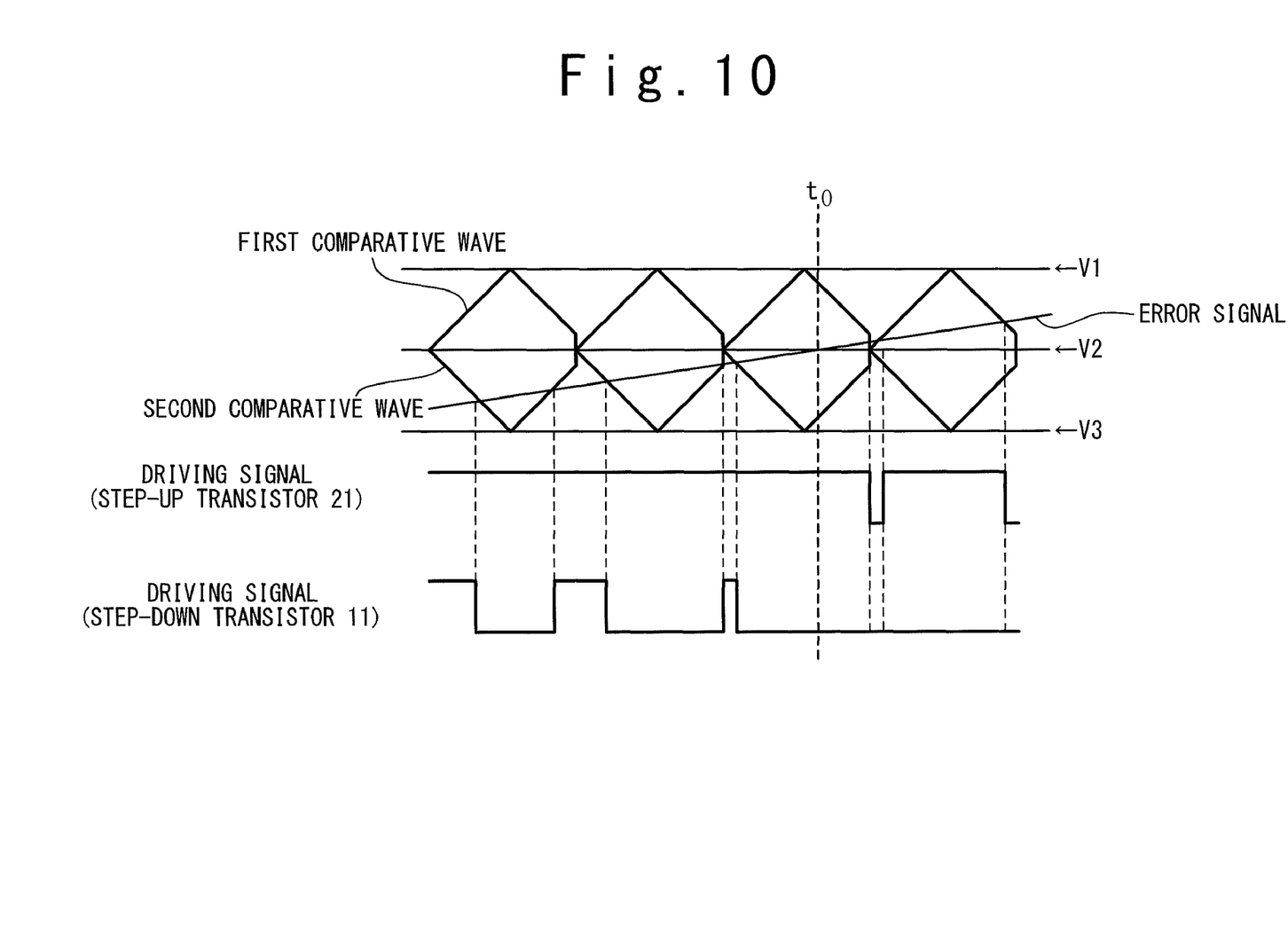
FIG. 10 is a timing chart for the DC-DC converter according to the first embodiment of the present invention.

Referring to FIG. 10, operations of the DC-DC converter according to the present embodiment are described. FIG. 10 is a timing chart illustrating relationships among the first and second comparative waves, the error signal, and the driving signals.

As shown in FIG. 10, it is assumed that a voltage of the error signal is equal to or lower than the second reference voltage V2 at or before time t0, and higher than the voltage V2 after time t0.

At or before the time t0, the error signal is equal to or is lower than the first comparative wave in voltage. Accordingly, the first comparator 4-1 keeps supplying the switch control circuit 3 with the first comparison result signal indicating that the error signal is equal to or is lower than the first comparative wave in voltage. The switch control circuit 3 keeps supplying the driving signal to keep the step-up transistor 21 in OFF state based on the first comparison result signal. For example, the switch control circuit 3 keeps supplying the first comparison result signal indicating a high level to the step-up transistor 21 to set the step-up transistor 21 in OFF state. Also, the switch control circuit 3 keeps supplying the first comparison result signal indicating the high level to the step-up transistor 21 to keep the step-up transistor 22 in ON state (not shown in the figure) Since the switches are not switched, the step-up circuit 2 is kept in a non-driving state.

At or before the time t0, the voltage of the error signal falls within the amplitude of the second comparative wave. Accordingly, the second comparator 4-2 supplies the second comparison result signal indicating alternately a high level and a low level to the switch control circuit 3. Based on the second comparison result signal, the switch control circuit 3 supplies the step-down driving signal to the step-down transistor 11 to alternate ON and OFF states of the step-down transistor 11. This causes the step-down transistor 11 to alternate ON and OFF states, and therefore the reactor L outputs the voltage to which the primary voltage has been stepped down. That is, the step-down circuit 1 is brought into a driving state.

In short, at or before the time t0, only the step-down circuit 1 is driven, and the primary voltage is stepped down and then outputted as the secondary voltage.

On the other hand, at or after the time t0, the voltage of the error signal falls within the amplitude of the first comparative wave. For this reason, the first comparator 4-1 supplies the first comparison result signal indicating alternately a high level and a low level. Accordingly, the switch control circuit 3 supplies the step-up driving signal to the step-up transistor 21 of the step-up circuit 2 to alternate ON and OFF state of the step-up transistor 21. This brings the step-up circuit 2 into a driving state.

At or after the time t0, the voltage of the error signal is equal to or higher than the second comparative wave in voltage. Accordingly, the second comparator 4-2 keeps supplying the switch control circuit 3 with the second comparison result signal indicating that the error signal is equal to or is higher than the second comparative wave in voltage. The switch control circuit 3 keeps supplying the driving signal to the step-down transistor 11 to keep the step-down transistor 11 in ON state. Consequently, the step-down transistor 11 is not switched, and thus the step-down circuit 1 is not driven.

In short, at or after the time t0, only the step-up circuit 2 is driven, and the primary voltage is stepped up and then outputted as the secondary voltage.

As described above, according to the present embodiment, the signals (first and second comparative waves, and error signal) are supplied to the comparators 4-1 and 4-2 without passing through a circuit that generates a phase difference, such as a level shift circuit, and thus it is not necessary to consider the phase difference generated by the level shift circuit. Accordingly, a configuration in which one of the step-up and step-down circuits is driven while the other one is not driven can be provided without complicating a circuit configuration. Thus, a step-up and step-down DC-DC converter having improved voltage conversion efficiency and good response can be provided.

Also, it is not necessary to consider the phase difference generated by the level shift circuit, and thus the amplitudes of the first and second comparative waves is not required to be crossed.

Furthermore, since the output terminal voltages of the comparative wave generating circuits 62-1 and 62-2 is forced to be reset to the voltage V2 by the reset circuit 66, even in a case of high frequency, each of the charging and discharging circuits 64-1 and 64-2 can be switched from one of the charging and discharging modes to the other with each of the output terminal voltages being kept to the voltage V2. That is, even in the case of high frequency, the amplitudes of the first and second comparative waves are never crossed each other, and a time period for which both of the step-up and step-down circuits 1 and 2 are simultaneously driven can be eliminated. This improves the voltage conversion efficiency of the DC-DC converter.

It is apparent that the present invention is not limited to the above embodiments, but may be modified and changed without departing from the scope and spirit of the invention.

What is claimed is:

1. A chopper type DC-DC converter comprising:
a voltage converting circuit configured to convert a first voltage into a second voltage;
a comparative wave generating circuit configured to generate a first comparative wave and a second comparative wave such that a voltage range of said first comparative wave is different from a voltage range of said second comparative wave;
a comparator group configured to generate a first comparison result signal indicating a result of comparison between said first comparative wave and an error signal indicating an error between said second voltage and target voltage and a second comparison result signal indicating a result of comparison between said second comparative wave and said error signal; and
a switch control circuit configured to control said voltage converting circuit based on said first comparison result signal and said second comparison signal,
wherein said comparative wave generating circuit includes a first comparative wave generating circuit and a second comparative wave generating circuit, and
said first comparative wave generating circuit and said second comparative wave generating circuit respectively generate said first comparative wave and said second comparative wave based on different source voltage groups,
wherein said voltage range of said first comparative wave is from a second reference voltage to a first reference voltage, and said voltage range of said second comparative wave is from a third reference voltage to said second reference voltage, and said first reference voltage is higher than said second reference voltage, and said third reference voltage is lower than said second reference voltage,
wherein said first comparative wave generating circuit includes:
a first capacitor having a first electrode connected to a first output terminal of said first comparative wave generating circuit;
a first charging and discharging circuit connected to said first electrode and configured to charge or discharge said first capacitor at a constant current; and
a first charging and discharging control circuit configured to switch said first charging and discharging circuit between charging mode and discharging mode, and
said second comparative wave generating circuit includes:
a second capacitor having a second electrode connected to a second output terminal of said second comparative wave generating circuit;
a second charging and discharging circuit connected to said second electrode and configured to charge or discharge said second capacitor at a constant current; and
a second charging and discharging control circuit configured to switch said second charging and discharging circuit between charging mode and discharging mode.

2. The chopper type DC-DC converter according to claim 1, wherein said voltage converting circuit steps down said first voltage to said second voltage based on switching of a step-down switch group and steps up said first voltage to said second voltage based on switching of a step-up switch group, and
said switch control circuit controls said switching of said step-up switch group based on said first comparison result signal and controls said switching of said step-down switch group based on said second comparison result signal.

3. The chopper type DC-DC converter according to claim 2, wherein said source voltage groups include a first source voltage group and a second source voltage group,
said first source voltage group includes said first reference voltage and said second reference voltage,
said second source voltage group includes said second reference voltage and said third reference voltage,
said first comparative wave generating circuit generates said first comparative wave by using said first reference voltage and said second reference voltage as source voltages such that amplitude of said first comparative wave ranges from said second reference voltage to said first reference voltage,
said second comparative wave generating circuit generates said second comparative wave by using said third reference voltage and said second reference voltage as source voltages such that amplitude of said second comparative wave ranges from said third reference voltage to said second reference voltage.

4. A chopper type DC-DC converter comprising:
a voltage converting circuit configured to convert a first voltage into a second voltage;
a comparative wave generating circuit configured to generate a first comparative wave and a second comparative wave such that a voltage range of said first comparative wave is different from a voltage range of said second comparative wave;
a comparator group configured to generate a first comparison result signal indicating a result of comparison between said first comparative wave and an error signal indicating an error between said second voltage and target voltage and a second comparison result signal indicating a result of comparison between said second comparative wave and said error signal; and
a switch control circuit configured to control said voltage converting circuit based on said first comparison result signal and said second comparison signal,
wherein said comparative wave generating circuit includes a first comparative wave generating circuit and a second comparative wave generating circuit, and
said first comparative wave generating circuit and said second comparative wave generating circuit respectively generate said first comparative wave and said second comparative wave based on different source voltage groups, wherein said voltage converting circuit steps down said first voltage to said second voltage based on switching of a step-down switch group and steps up said first voltage to said second voltage based on switching of a step-up switch group, and
said switch control circuit controls said switching of said step-up switch group based on said first comparison result signal and controls said switching of said step-down switch group based on said second comparison result signal,
wherein said comparative wave generating circuit includes a reset circuit configured to perform resets of voltage at a first output terminal of said first comparative wave generating circuit and of voltage at a second output terminal of said second comparative wave generating circuit to a same reference voltage at a predetermined timing,
wherein said first comparative wave generating circuit includes a first reset switch configured to switch on and off supply of said reference voltage to said first output terminal, said second comparative wave generating circuit includes a second reset switch configured to switch on and off supply of said reference voltage to said second output terminal, and said reset circuit performs said resets by switching said first reset switch and said second reset switch.

5. The chopper type DC-DC converter according to claim 1, wherein said first comparative wave generating circuit and said second comparative wave generating circuit generate said first comparative wave and said second comparative wave such that said first comparative wave and said second comparative wave are same in frequency and opposite in phase.

6. A chopper type DC-DC converter comprising:
a voltage converting circuit configured to convert a first voltage into a second voltage;
a comparative wave generating circuit configured to generate a first comparative wave and a second comparative wave such that a voltage range of said first comparative wave is different from a voltage range of said second comparative wave;
a comparator group configured to generate a first comparison result signal indicating a result of comparison between said first comparative wave and an error signal indicating an error between said second voltage and target voltage and a second comparison result signal indicating a result of comparison between said second comparative wave and said error signal; and
a switch control circuit configured to control said voltage converting circuit based on said first comparison result signal and said second comparison signal,
wherein said comparative wave generating circuit includes a first comparative wave generating circuit and a second comparative wave generating circuit, and
said first comparative wave generating circuit and said second comparative wave generating circuit respectively generate said first comparative wave and said second comparative wave based on different source voltage groups,
wherein said voltage range of said first comparative wave is from a second reference voltage to a first reference voltage, and said voltage range of said second comparative wave is from a third reference voltage to said second reference voltage, and said first reference voltage is higher than said second reference voltage, and said third reference voltage is lower than said second reference voltage,
wherein said voltage converting circuit steps down said first voltage to said second voltage based on switching of a step-down switch group and steps up said first voltage to said second voltage based on switching of a step-up switch group, and
said switch control circuit controls said switching of said step-up switch group based on said first comparison result signal and controls said switching of said step-down switch group based on said second comparison result signal,
wherein said source voltage groups include a first source voltage group and a second source voltage group,
said first source voltage group includes said first reference voltage and said second reference voltage,
said second source voltage group includes said second reference voltage and said third reference voltage,
said first comparative wave generating circuit generates said first comparative wave by using said first reference voltage and said second reference voltage as source voltages such that amplitude of said first comparative wave ranges from said second reference voltage to said first reference voltage, said second comparative wave generating circuit generates said second comparative wave by using said third reference voltage and said second reference voltage as source voltages such that amplitude of said second comparative wave ranges from said third reference voltage to said second reference voltage, wherein said comparative wave generating circuit includes a reference voltage circuit configured to supply said first comparative wave generating circuit with said first reference voltage and said second reference voltage and supply said second comparative wave generating circuit with said second reference voltage and said third reference voltage, said reference voltage circuit includes resistors connected in series between a direct-current power supply and a ground, said resistors includes a first resistor and a second resistor, said first reference voltage is supplied to said first comparative wave generating circuit from a first node between said direct-current power supply and said first resistor, said second reference voltages is supplied to said first comparative wave generating circuit and said second comparative wave generating circuit from a second node between said first resistor and said second resistor, and said third reference voltage is supplied to said second comparative wave generating circuit from a third node between said second resistor and said ground.

7. A chopper-mode DC-DC converting method comprising:
converting a first voltage into a second voltage;
generating a first comparative wave and a second comparative wave based on different source voltage groups such that a voltage range of said first comparative wave is different from a voltage range of said second comparative wave;
comparing an error signal indicating an error between said second voltage and a target voltage with each of said first comparative wave and said second comparative wave; and
controlling said converting based on a result of said comparing,
wherein said voltage range of said first comparative wave is from a second reference voltage to a first reference voltage, and said voltage range of said second comparative wave is from a third reference voltage to said second reference voltage, and said first reference voltage is higher than said second reference voltage, and said third reference voltage is lower than said second reference voltage, and wherein said generating includes resetting both said first comparative wave and said second comparative wave to the second reference voltage at a predetermined timing,
wherein the first comparative wave and the second comparative wave are generated by a first comparative wave generating circuit having a first reset switch and a first output terminal and a second comparative wave generating circuit having a second reset switch and a second output terminal, respectively, and
wherein the resetting of the first comparative wave is performed by switching on supply of the second reference voltage to the first output terminal of the first comparative wave generating circuit, and the resetting of the second comparative wave is performed by switching on supply of the second reference voltage to the second output terminal of the second comparative wave generating circuit.

* * * * *